United States Patent
Martin (10) Patent No.: US 6,684,301 B1
(45) Date of Patent: Jan. 27, 2004

(54) OUT OF ORDER EXECUTION MEMORY ACCESS REQUEST FIFO

(75) Inventor: Gregor J. Martin, Sunnyvale, CA (US)

(73) Assignee: LSI Logic Corporation, Milpitas, CA (US)

( * ) Notice: Subject to any disclaimer, the term of this patent is extended or adjusted under 35 U.S.C. 154(b) by 43 days.

(21) Appl. No.: 09/871,177

(22) Filed: May 31, 2001

(51) Int. Cl.[7] .............................................. G06F 12/00
(52) U.S. Cl. ........................ 711/151; 711/155; 711/158
(58) Field of Search ................. 711/151, 155, 711/158

(56) References Cited

U.S. PATENT DOCUMENTS 5,377,341 A * 12/1994 Kaneko et al. ............. 711/169
5,832,304 A * 11/1998 Bauman et al. ............... 710/39
6,202,101 B1 * 3/2001 Chin et al. ...................... 710/5
6,356,972 B1 * 3/2002 Chin et al. ................... 710/310

* cited by examiner

Primary Examiner—Reba I. Elmore
(74) Attorney, Agent, or Firm—Christopher P. Maiorana PC (57) ABSTRACT

A circuit generally comprising a queue having an input and an output. The queue may be used to buffer memory requests generated by a processor to access a memory. The input may be configured to receive a plurality of memory requests. The memory requests may include a plurality of write requests and a plurality of read requests. The output may be configured to present the memory requests. The queue may be configured to (i) store the memory requests received at the input in an arrival order, (ii) rearrange the memory requests by propagating each read request ahead of each write request to establish a presentation order, and (iii) present the memory requests at the output in the presentation order.

19 Claims, 6 Drawing Sheets

OUT OF ORDER EXECUTION MEMORY ACCESS REQUEST FIFO

FIELD OF THE INVENTION

The present invention relates to a method and/or architecture for improved memory access efficiency generally and, more particularly, to a queue circuit that propagates memory read requests ahead of memory write requests.

BACKGROUND OF THE INVENTION

Access to memory has always been very important. Often many different subsystems are attempting to read and write from/to a single memory in rapid succession. Writes are not time critical. As long as the data is accepted somewhere, the source of the write can then carry on processing. Reads are however time critical. Usually, when a read is requested, the requester has to stall until the data is made available. If there are lots of writes ahead of the read, it can stall the requesting module for a long time. The motivation is to reduce the time that the read takes to get serviced.

A high speed processor is capable of presenting a new write access request in a single clock cycle. A random access memory commonly requires many clock cycles to accept each write access request. A write First-In-First-Out (FIFO) circuit is commonly positioned between the processor and the memory to solve the timing difference between the processor and the memory.

The write FIFO temporarily stores the write access requests at a speed that matches the processor. The write access requests are stored in order of arrival. The write FIFO presents the stored write access requests to the memory at a speed that matches the memory. The write access requests are presented to the memory in the same order of arrival as received from the processor.

When the processor issues a read access request, then the read access request commonly contends with the write access requests already in the FIFO. As a result, servicing of the read access requests by the memory is delayed until the earlier write access requests are cleared or flushed from the write FIFO. The delay forces the processor to stall and wait as the data associated with the read access request is retrieved from the memory.

SUMMARY OF THE INVENTION

The present invention concerns a circuit generally comprising a queue having an input and an output. The queue may be used to buffer memory requests generated by a processor to access a memory. The input may be configured to receive a plurality of memory requests. The memory requests may include a plurality of write requests and a plurality of read requests. The output may be configured to present the memory requests. The queue may be configured to (i) store the memory requests received at the input in an arrival order, (ii) rearrange the memory requests by propagating each read request ahead of each write request to establish a presentation order, and (iii) present the memory requests at the output in the presentation order.

The objects, features and advantages of the present invention include providing a method and/or architecture for improved memory access efficiency generally and, more particularly, to a circuit that may (i) decrease read access request latency to a memory, (ii) avoid stall cycles by a requesting processor, and/or (iii) maintain proper sequencing between a write access request and a later read access request to the same address.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
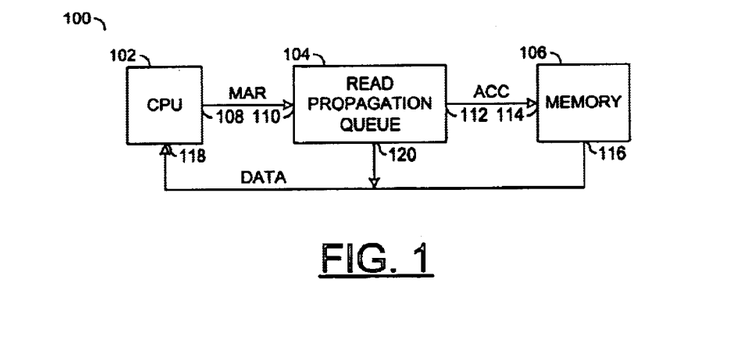
FIG. 1 is a block diagram of a preferred embodiment of the present invention.

Referring to FIG. 1, a block diagram of a system 100 is shown in accordance with a preferred embodiment of the present invention. The system 100 generally comprises a circuit 102, a circuit 104, and a circuit 106. The circuit 102 may be implemented as a central processor unit (CPU). The circuit 104 may be implemented as a read propagation queue. The circuit 106 may be implemented as a memory. The memory 106 may be any type of memory including, but not limited to random access memory, cache memory, flash memory, programmable read-only memory, and the like.

All access requests ("requests" for short) generated by the CPU 102 may be received by the read propagation queue 104. Read requests may be propagated to the front of the read propagation queue 104 as read requests may be of a higher priority than write requests. If a write request in the queue is at the same address as the read request, then the data value contained in the write request may be used and the old data value in the memory 106 may not read. The read request may thus be completed and the read request may be removed from the read propagation queue 104.

The CPU 102 may generate a signal (e.g., MAR) to store and retrieve data values from the memory 106. The signal MAR may be implemented as a memory access request ("memory request" for short) signal. The signal MAR may comprise one or more read access requests ("read requests" or "read" for short) and/or one or more write access requests ("write requests" or "write" for short). The CPU 102 may have an output 108 to present the signal MAR to an input 110 of the read propagation queue 104.

The read propagation queue 104 may receive the signal MAR in an arrival order. The arrival order may be in a first-come-first-server order where the individual memory access requests are stored in order of arrival. The read propagation queue 104 may rearrange the stored write access requests and the read access requests into a presentation order. The presentation order may place the read access requests ahead of the write access requests. The read propagation queue 104 may present the read access requests and the write access requests as a signal (e.g., ACC) at an output 112 in the presentation order. The signal ACC may be implemented as an access request signal.

The memory 106 may have an input 114 to receive the signal ACC. The memory 106 may respond to read access requests within the signal ACC by presenting a signal (e.g., DATA). The memory 106 may have an output 116 to present the signal DATA to an input 118 of the CPU 102.

The read propagation queue 104 may also present the signal DATA in some situations. The read propagation queue 104 may compare a read address of each stored read access request with the write addresses of the stored write access requests. If the read address equals the write address, then the data value associated with the matching write access request may be used to service the read access request. The read propagation queue 104 may have an output 120 to present the data value in the signal DATA to the input 118 of the CPU 102.

Figure 2:
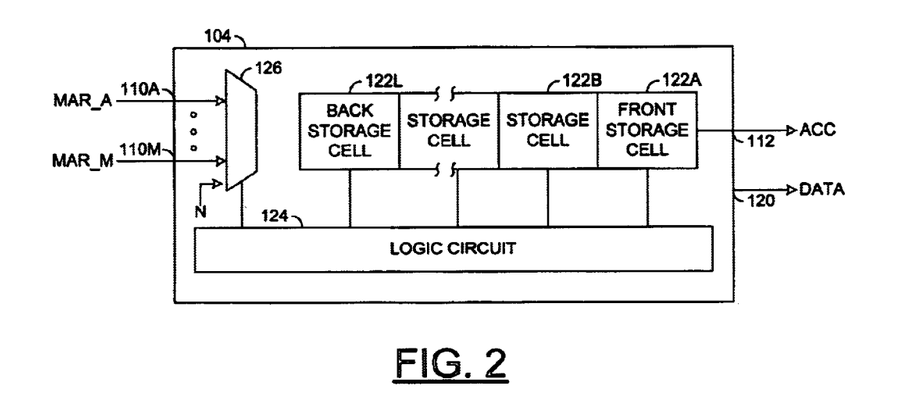
FIG. 2 is a detailed block diagram of a read propagation queue.

Referring to FIG. 2, a detailed block diagram of an example circuit implementing the read propagation queue 104 is shown. The read propagation queue 104 may comprise multiple storage cells 122A–L and a logic circuit 124. An optional multiplexer 126 may be provided in situations where there is more than one source of the signal MAR (e.g., inputs 110A–M). Control for the multiplexer 126 may be provided by the logic circuit 124. The multiplexer 126 may have an additional input 110N to receive a signal (e.g., N). The signal N may be implemented as a null access request or an empty condition that may represent neither a read access request nor a write access request.

The storage cells 122 in the read propagation queue 104 may range in number from 2 through 128 or more. Larger numbers may allow from more memory access requests to be stored. Smaller numbers may allow for faster response times. A practical range for the number of storage cells 122 may be from 4 to 16. Other designs may be implemented for the read access queue 104 to meet the design criteria of a particular application.

Each storage cell 122A–L may store a read access request, a write access request, or a null access request. A read access request generally identifies a read address within the memory 106 where a desired data value is stored. A write access request generally identifies a write address within the memory 106 where a desired data value is to be stored. The write access request also carries the desired data value to be stored.

Each storage cell 122A–L may be coupled to one or two neighboring storage cells 122A–L. The back (leftmost or last) storage cell 122L may be connectable to the input 110 or the multiplexer 126 to receive the signal MAR. The front (rightmost or first) storage cell 122A may be connectable to the output 112 to present the signal ACC.

The storage cells 122A–L may be operational to shift the memory access requests forward (to the right) toward the output 112. The storage cells 122A–L may be operational to shift the memory access requests backwards (to the left) toward the input 110. The storage cells 122A–L may be operational to maintain the memory access requests stationary without shifting in either direction. The storage cells 122A–L may be operational to pass the memory access requests through from a neighboring storage cell 122 on one side to a neighboring storage cell 122 on the other side. Control for shifting, maintaining, and passing the memory access requests may be provided to the storage cells 122A–L by the control logic 124. The control logic 124 may be connected to each of the storage cells 122A–L to provide control and to receive addresses and data values, if present, contained within the memory access requests.

Figure 3:
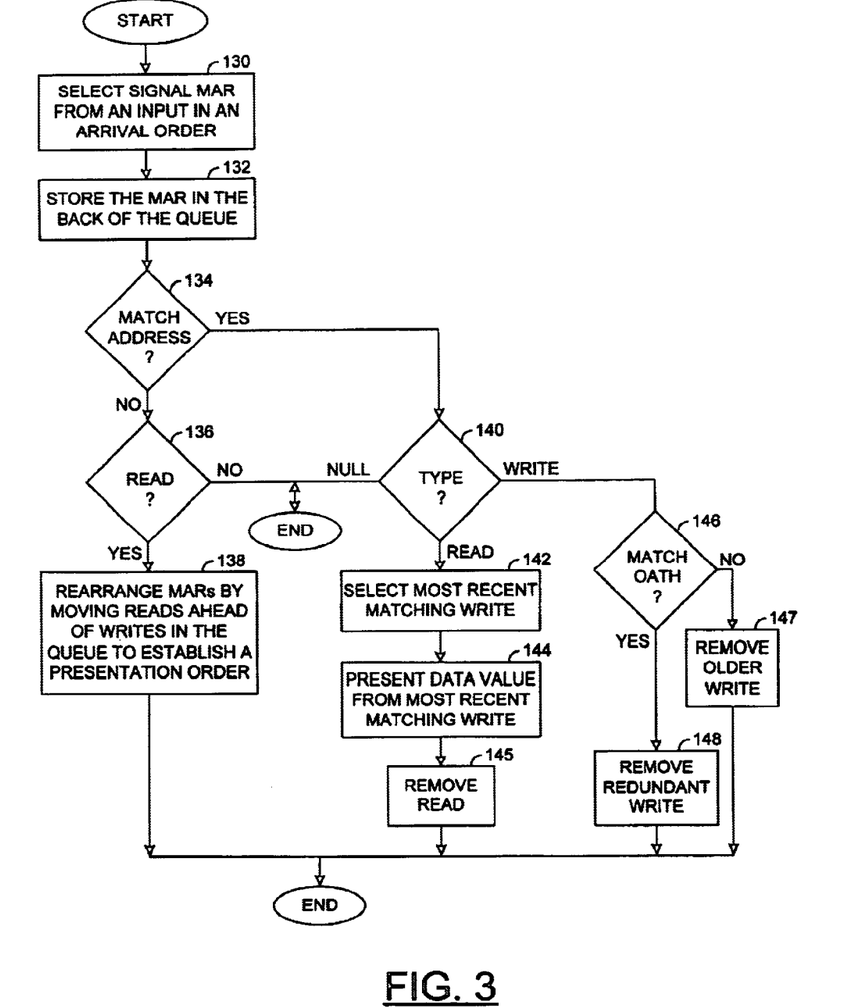
FIG. 3 is a flow diagram of a method of operating the read propagation queue.

Referring to FIG. 3, a flow diagram of a method of operating the read propagation queue 104 is shown. The multiplexer 126 may select a signal MAR from among the signals MAR_A through MAR_M in the arrival order (e.g., block 130). The arrival order may be implemented as a first-come-first-serve order. In one embodiment, the arrival order may be implemented in a round-robin fashion where each input 110A–N is sampled in a set rotation for the new memory access requests. In another embodiment, the arrival order may be a weighted priority that favors certain inputs 110 more than others. Other arrival orders may be implemented to meet the design criteria of a particular application.

The multiplexer 126 may present new memory access requests to the back storage cell 122L for storage, one at a time (e.g., block 132). The logic circuit 124 may check an address of each new memory access request for a match among addresses of the existing memory access requests (e.g., decision block 134). If the new address does not match another address(e.g., the NO branch of decision block 134), then a check may be made to determine if the new memory access request is a read access request (e.g., decision block 136).

If the memory access request is a read access request (e.g., the YES branch of decision block 136), then the logic circuit 124 may control the storage cells 122A–L to rearrange the memory access requests to propagate the new read access request ahead of the stored write access requests (e.g., block 138). If the new memory access request is not a read access request (e.g., the NO branch of decision block 136), then the new memory access request may be left in the back storage cell 122L. The read propagation queue 104 may then wait for the next signal MAR to arrive and/or present the memory access request in the front storage cell 122A to the memory 106.

If the address of the new memory access request matches another address stored in the storage cells 122A–K (e.g., the YES branch of decision block 134), then a check may be made to determine an access request type for the new memory access request (e.g., decision block 140). If the access request type is the null access request type (e.g., the NULL branch of decision block 140), then the new null access request may remain in the back storage cell 122L. It may be acceptable to have several null access requests with the same null address and the same null data value stored simultaneously in the storage cells 122A–L.

If the new memory access request is a read access request (e.g., the READ branch of decision block 140), then the logic circuit 124 may determine a most recent matching write access request among possibly several matching write access requests (e.g., block 142). The most recent matching write access request may be selected since the most recent matching write access request should overwrite any older matching write access requests before the new read access request should be serviced. A data value from the most recent matching write access request may then be presented (e.g., block 144). The read access request may therefor be removed from the read propagation queue 104 (e.g., block 145).

If the new memory access request is a write access request (e.g., the WRITE branch of decision block 140), then a check may be made to determine if the data value of the new memory access request matches the data value of any other write access requests having the same address (e.g., decision block 146). If the data value of the new write access request does not equal another data value of another stored write access request having the same address (e.g., the NO branch of decision block 146), then the new write access request may remain in the back storage cell 122L. Optionally, an older write access request having the same address but different data value may be removed from the read propagation queue 104 (e.g., block 147). The older write access request may be obsoleted by the new write access request to the same address and thus may be withheld from the memory 106. If the new write access request has the same address and the same data value as an existing write access request (e.g., the YES branch of decision block 146), then a redundant write access requests may be removed from the read propagation queue 104 (e.g., block 148). In one embodiment, the redundant write access request removed may be the new write access request. In another embodiment, the redundant write access request may be the older existing write access request. In still another embodiment, the new write access request and the older write access request may both remain in the storage cells 122A–L.

Referring to FIGS. 4A–D, diagrams illustrating an example of a propagation of a read access request are shown. The read and write access requests may be shown in FIG. 4 in the following format. The top line may identify the memory access request as a write (Wx) a read (Rx), or a null (Nx) access request. The number "x" may be an integer than may indicate an arrival order at the input 110. The second line may identify an address (e.g., Ay) of the memory access request. The number "y" may represent an actual address value that in practice may be 32-bits long. The address Ay may be meaningless for the null access requests and thus left bank. The third line may identify a data value (e.g., Dz) for the memory access request. The number "Z" may represent an actual data value that in practice may be 32-bits long. The data value Dz may be blank for the read access requests and the null access requests.

Figure 4A:
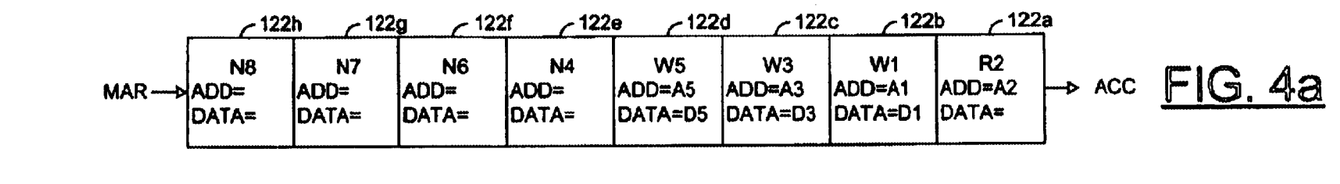
FIGS. 4A–D are diagrams illustrating an example of propagating a read access request.

Referring to FIG. 4A, various memory access requests stored in the storage cells 122A–H at an instant in time are shown. In the example, the memory access request in the first storage cell 122A may be a read access request R2. The next three storage cells 122B–D may store the write access requests W1, W3, and W5. The last four storage cells 122E–H may store null access requests N4, N6, N7, and N8.

Figure 4B:
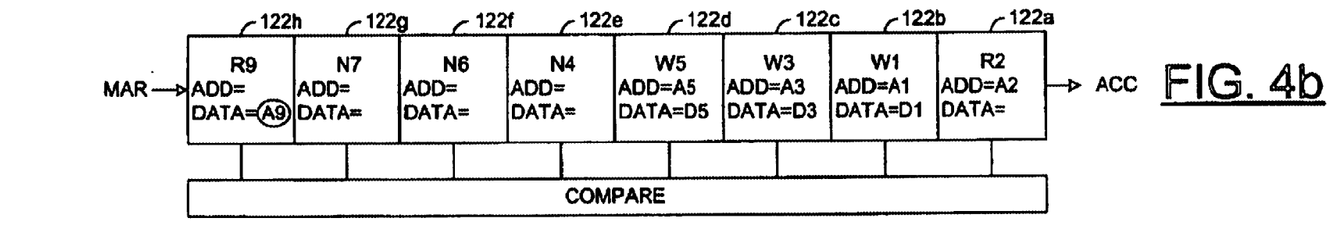

Referring to FIG. 4B, a new read access request R9 may be stored in the back storage cell 122H. The read access request R9 may replace the null access request N8. The logic circuit 124 may compare the read address A9 of the read access request R9 with the write addresses A1, A3, and A5 of the write access requests W1, W3, and W5. Since the read address A9 does not match the write addresses A1, A3 or A5, then the read access request A9 may be moved (propagated) ahead of the write access requests W1, W3 and W5.

Figure 4C:
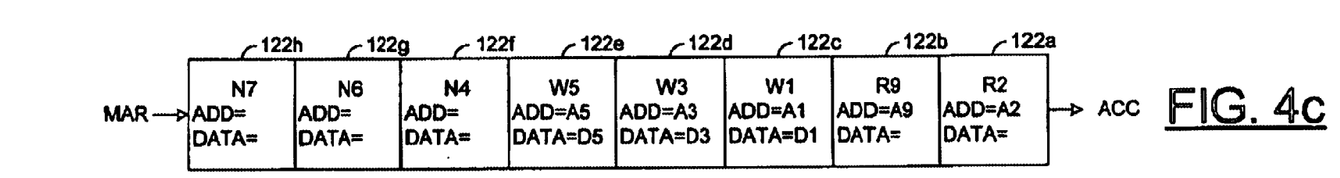

Referring to FIG. 4C, the contents of the storage cells 122A–H are shown after rearranging the memory access requests. The write access requests W1, W3, and W5 may be shifted backwards a storage cell 122 to make room for the read access request R9 in the second storage cell 122B. The read access request R2 may remain in the front storage cell 122A.

Figure 4D:
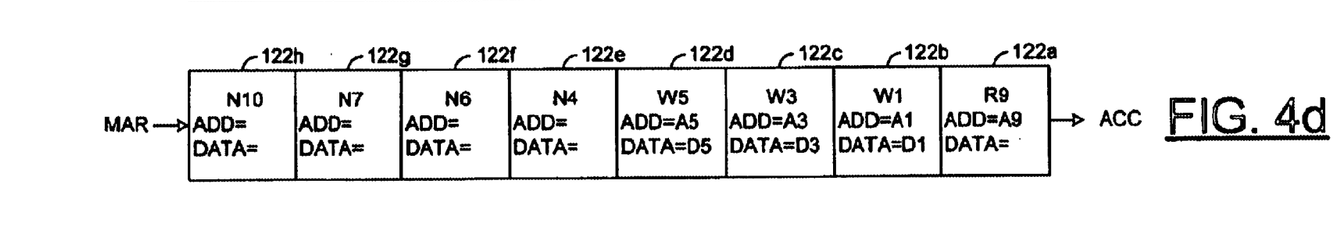

Referring to FIG. 4D, the contents of the storage cells 122A–H are shown after rearranging with the read access request R2 being simultaneously shifted forward (out) to the memory 106. The write access requests W1, W3, and W5 may remain unshifted while the read access request R9 may be moved to the font storage cell 122A. Another null access request N10 may be stored in the back storage cell 122H to fill the void caused by the removal of the read access request R2.

Figure 5A:
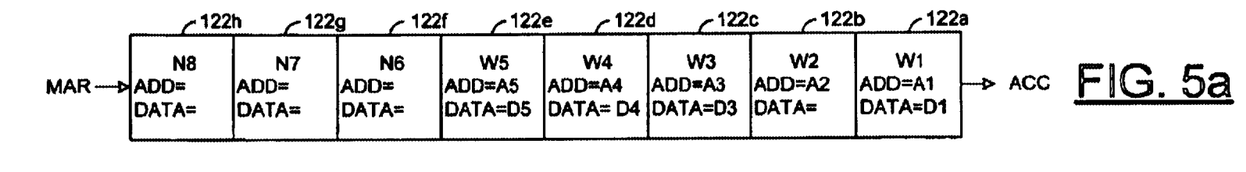
FIGS. 5A–D are diagrams illustrating an example of servicing the read access request from within the read propagation queue.

Referring to FIGS. 5A–D, diagrams illustrating an example of a read access request being serviced by the read propagation queue 104 are shown. FIG. 5A shows various memory access requests stored in the storage cells 122A–H at an instant in time. In the example, the first five storage cells 122A–E hold write access requests W1, W2, W3, W4, and W5. The last three storage cells 122F–H may store null access requests N6, N7, and N8.

Figure 5B:
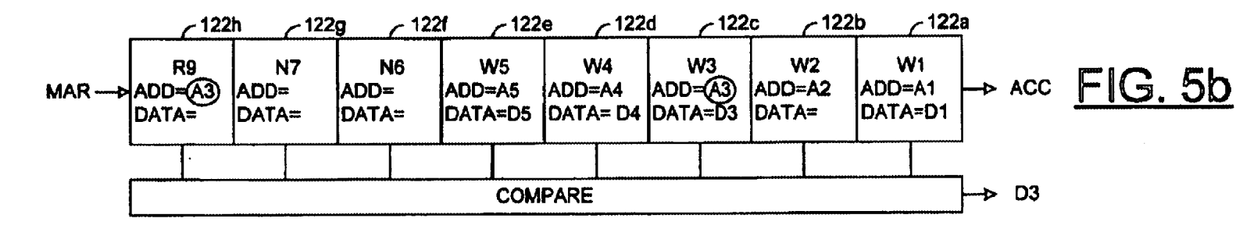

Referring to FIG. 5B, a new read access request R9 may be stored in the back storage cell 122H. The logic circuit 124 may compare the read address A3 of the read access request R9 with the addresses A1, A2, A3, A4, and A5 of the write access requests W1, W2, W3, W4, and W5. The logic circuit 124 may find that the read address A3 may be equal to the write address A3 of the write access request W3. The logic circuit 124 may then control the third storage cell 122C to present to the output 120 the data value D3 from the write access request W3 to satisfy the read access request R9.

Figure 5C:
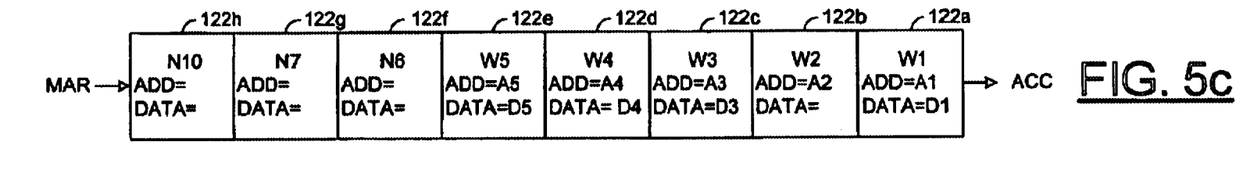

Referring to FIG. 5C, the read access request R9 may be removed after finding the matching write access request W3. A new null access request N10 may be stored in the back storage cell 122H to fill the void left by removing the read access request R9.

Figure 5D:
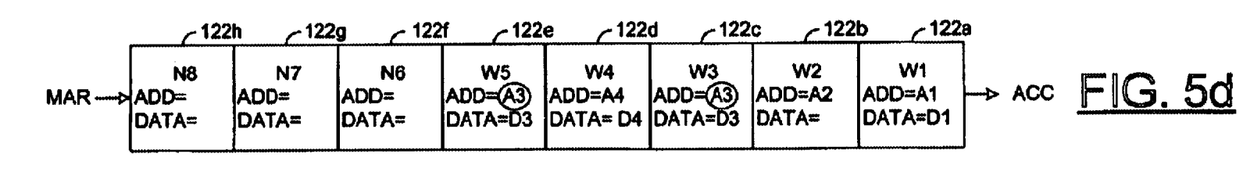

Referring to FIG. 5D, an alternate instant set of memory access requests is shown. The write address A3 of the write access request W5 may also match the write address A3 of the write access request W3. When the read address A3 of the read access request R9 is compared, the logic circuit 124 may now find two matching write access requests W3 and W5. Based upon the arrival order, the write access request W3 should write the data value D3 to the address A3 of the memory 106 first. The write access request W5 should write the data value D5 to the address A3 of the memory 106 second. Next, the read access request R9 should read the data value D5 from the address A3 of the memory 106. To maintain the proper order, the logic circuit 124 may select the write access request W5 (the most recent matching write access request) to service the read access request R9.

Figures 6A, 6B:
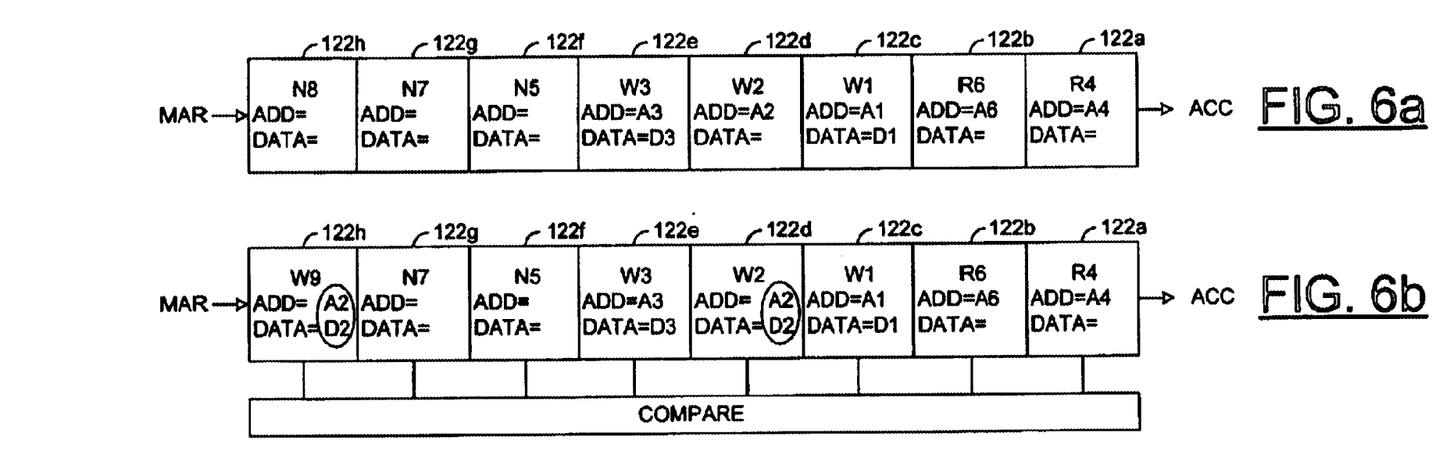
FIGS. 6A–C are diagrams illustrating an example of eliminating a redundant write access request.
Figure 6C:
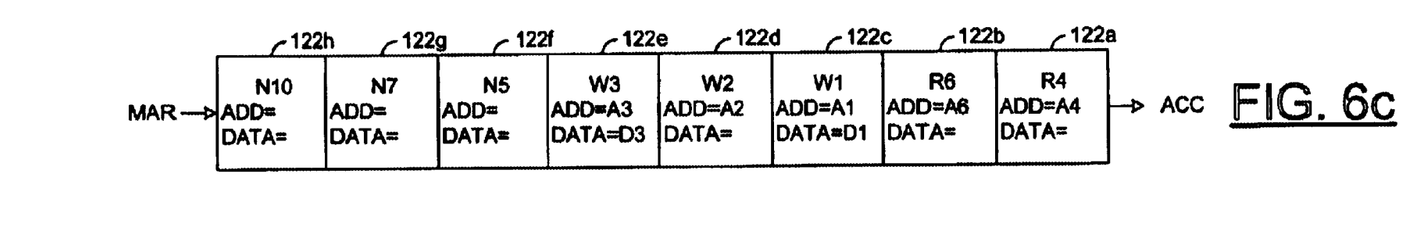

Referring to FIGS. 6A–C, diagrams illustrating a redundant write access request are shown. FIG. 6A shows various memory access requests stored in the storage cells 122A–H at an instant in time. In the example, the first two storage cells 122A–B may store the read access requests R4 and R6. The next three storage cells 122C–E may store the write access requests W1, W2, and W3. The last three storage cells 122F–H may store the null access requests N5, N7, and N8.

Referring to FIG. 6B, a new write access request W9 may be stored in the back storage cell 122H. The logic circuit 124 may compare the address A2 and the data value D2 of the new write access request W9 with the addresses A1, A2, and A3 and the data values D1, D2, and D3 of the write access requests W1, W2, and W3. The logic circuit 124 may find that the new write access request W9 may be redundant to the earlier write access request W2. As a result, the logic circuit 124 may command that the new write access request W9 be removed from the back storage cell 122H.

Referring to FIG. 6C, the memory access requests after the redundant write access request W9 has been removed is shown. Another null access request N10 may be stored in the back storage cell 122H. In one embodiment, the redundant write access request W9 may be left in the storage cells 122A–L. At a time after the write access request W2 writes to the memory 106, the redundant write access request W9 may rewrite the same data value at the same address in the memory 106.

Figure 7:
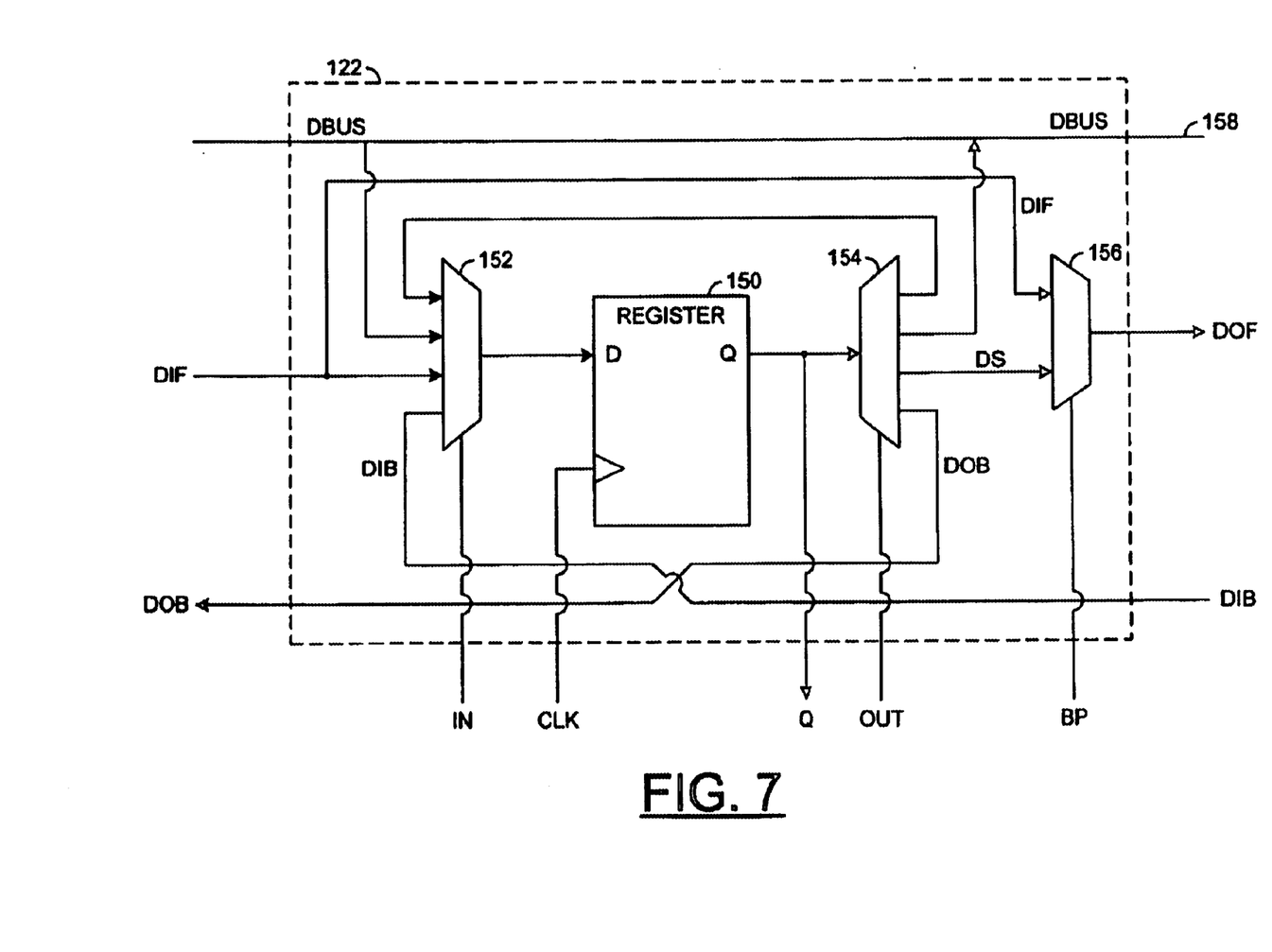
FIG. 7 is a schematic of a storage cell.

Referring to FIG. 7, a schematic of an example storage cell 122 is shown. The storage cell 122 may comprise a register 150, an input multiplexer 152, a demultiplexer 154, a bypass multiplexer 156, and a portion of a bus 158. The schematic only shows one bit of the multiple-bits of each memory access request for simplicity. Other designs of the storage cell 122 may be implemented to meet the design criteria of a particular application.

The input multiplexer 152 may receive a signal (e.g., IN) to select from among several signals (e.g., DIF, DBUS, DH, and DIB). The input multiplexer 152 may present the selected signal to the register 150 as another signal (e.g., D). The register 150 may store the signal D in response to an edge of a clock signal (e.g., CLK). The register.150 may present the stored signal D as a signal (e.g., Q). The demultiplexer 154 may receive a signal (e.g., OUT) to direct the signal Q. The demultiplexer 154 may present the signal Q as several other signals (e.g., DS, DOB) the signal DBUS and the signal DH. The bypass multiplexer 156 may receive a signal (e.g., BP) to control selection between the signal DIF and the signal DS. The output multiplexer 156 may present the signal DOF to an adjacent storage cell 122 (FIG. 2) as the signal DIF. The signals IN, CLK, OUT, and BP may be presented to the storage cell 122 by the logic circuit 124 (FIG. 2). The signal Q may be presented by the storage cell 122 to the logic circuit 124.

The signal DIF (data input forward) may be implemented as a data input signal shifted in a forward direction. The signal DIF may be presented by an adjacent storage cell 122 (FIG. 2) behind the current storage cell 122. The signal DIF may be the signal MAR for the back (last) storage cell 122L. The signal D may be implemented as a data input signal. The signal D may be the data input signal received and stored by the register 150. The signal Q may be implemented as a data output signal. The signal Q may be the data output signal presented by the register 150. The signal DS (data signal) may be implemented as a data output signal. The signal DS may be the same as the signal Q when selected through the demultiplexer 154. The signal DOF (data output forward) may be implemented as a data output signal. The signal DOF may be presented to an adjacent storage cell 122 (FIG. 2) ahead of the current storage cell 122. The signal DOF may be the signal ACC when presented by the first storage cell 122A. The signals DIF, D, Q, DS, and DOF may allow the storage cell 122 to shift a memory access request forward (to the right).

The signal DBUS may be implemented as a data signal on the bus 158. The signal DBUS may be presented and received by each of the storage cells 122A–L. The signal DBUS may be the same as the signal Q when selected through the demultiplexer 154. The signal DBUS may be presented by the multiplexer 152 as the signal D. The signals DBUS, D and Q may allow the storage cell 122 to move a memory access request in either direction to any other storage cell 122.

The signal DH (data hold) may be implemented as a data signal. The signal DH may be the same as the signal Q when selected by the demultiplexer 154. The signal DH may be presented by the input multiplexer 152 as the signal D. The signal DH may allow the storage cell 122 to maintain or hold the data value constant when the register 150 is clocked by a clock signal CLK.

The signal DIB (data input backwards) may be implemented as a data input signal. The signal DIB may be presented by an adjacent storage cell 122 (FIG. 2) ahead of the current storage cell 122. The input multiplexer 152 may present the signal DIB as the signal D when selected. The signal DOB (data output backward) may be implemented as a data output signal. The signal DOB may be presented to an adjacent storage cell 122 (FIG. 2) behind the current storage cell 122. The signals DIB, D, Q and DOB may allow the storage cell 122 to shift a memory access request backwards (to the left).

Referring to FIG. 2, the signal DIF and the signal DOF may be used along with the bypass multiplexer 156 to forward a memory access signal from the last storage cell 122L to another storage cell 122A–K holding a null access request. For example, the last five storage cells 122H–L may have the bypass multiplexers 154 set to bypass the register 150. A new memory access request received by the back storage cell 122 may propagate through the storage cells 122H–K. The new memory access request may then be presented as the signal DOF of the storage cell 122H to the storage cell 122G. In one embodiment, the bypass multiplexer 156 may be eliminated. Therefore, propagating a new memory access request through several storage cells 122 may require several cycles of the clock signal CLK.

In a system 100 where there may be only one outstanding read access request at a time, the read propagation queue 104 may be implemented as a modified first-in-first-out (FIFO) circuit. The modification may be a special parallel storage cell 122 (not shown) for storing the read access request. The write access requests may be stored in the FIFO in a conventional manner. The read access request in the special parallel storage cell 122 may be given a higher priority than any write access request at a head of the FIFO. In effect, the special parallel storage cell 122 may allow the read access request to advance ahead of the existing write access requests within the read propagation queue 104. Other implementations of the read propagation queue 104 may be provided to meet a design criteria of a particular application.

In other embodiments of the system 100, other types of circuits capable of presenting and/or receiving memory access requests may be implemented. For example, the circuit 102 may be implemented as, but not limited to, a direct memory access controller, a bus controller, a coprocessor, a floating point processor, an array processor, a pipelined processor, a parallel processor, a master circuit, a bus bridge, and the like. In another example, the circuit 106 may be implemented as, but not limited to, a peripheral device, a universal asynchronous receiver transmitter, a input/output circuit, a bus interface, a communications port, a storage device, a slave circuit, a bus bridge, and the like. Other types of circuits 102 and/or circuits 106 may be implemented to meet the design criteria of a particular application. In still another example, the circuit 104 may be implemented as part of a bus bridge circuit between the circuit 102 and the circuit 106.

While the invention has been particularly shown and described with reference to the preferred embodiments thereof, it will be understood by those skilled in the art that various changes in form and details may be made without departing from the spirit and scope of the invention.

What is claimed is:

1. A circuit comprising:
    an input configured to receive a plurality of memory requests, said memory requests including a plurality of write requests and a plurality of read requests;
    a first output configured to present said memory requests;
    a queue configured to (i) store said memory requests received at said input in an arrival order, (ii) rearrange said memory requests by propagating each said read request ahead of each said write request to establish a presentation order, and (iii) present said memory requests at said first output in said presentation order.

2. The circuit according to claim 1, wherein said queue is further configured to:

compare a read address of each said read request to a write address of each said write request currently stored; and present data from a matching write request having said write address equal to said read address at a second output.

3. The circuit according to claim 2, wherein said queue is further configured to remove said read request in response to presenting said data from said matching write request.

4. The circuit according to claim 2, wherein said queue is further configured to select said matching, write request as a most recently stored of a plurality of matching write requests.

5. The circuit according to claim 1, wherein said queue is further configured to:

compare a new address and a new data of a new write request with an address and a data of each said write request currently stored; and discard said new write request in response to finding a duplicate write request having said address and said data equal to said new address and said new data respectively.

6. The circuit according to claim 1, wherein said input is a plurality of inputs and said queue is further configured to select among said inputs prior to storing each said memory request.

7. The circuit according to claim 1, wherein said queue comprises a plurality of storage cells configured to maintain at least one of said memory requests stationary in response to rearranging.

8. The circuit according to claim 7, wherein said storage cells are further configured to shift said write requests away from said first output in response to rearranging.

9. The circuit according to claim 8, wherein said queue further comprises a bus, and said storage cells are further configured to (i) present a selected read request to said bus, and (ii) receive said selected read request from said bus.

10. A circuit for caching a plurality of memory requests wherein said memory requests comprise a plurality of write requests and a plurality of read requests, the circuit comprising:

means for storing said memory requests in an arrival order;

means for rearrange said memory requests by propagating each said read request ahead of each said write request to establish a presentation order; and means for presenting said memory requests: in said presentation order.

11. A method of caching a plurality of memory requests wherein said memory requests comprise a plurality of write requests and a plurality of read requests, the method comprising the steps of:

(A) storing said memory requests in an arrival order;

(B) rearranging said memory requests by propagating each said read request ahead of each said write request to establish a presentation order in response to storing; and (C) presenting said memory requests in said presentation order in response to rearranging.

12. The method according to claim 11, further comprising the steps of:

comparing a read address of each said read request with a write address of each said write request currently stored in response to storing each said read request; and presenting data from a matching write request having said write address equal to said read address out of said presentation order in response to comparing.

13. The method according to claim 12, further comprising the step of removing said read request in response to presenting said data from said matching write request.

14. The method according to claim 12, further comprising the step of selecting said matching write request as a most recently stored of a plurality of matching write requests in response to comparing.

15. The method according to claim 11, further comprising the steps of:

comparing a new address and a new data of a new write request to an address and a data of each said write request currently stored in response to storing said new write request; and discarding said new write request in response to finding a duplicate write request having said address and said data equal to said new address and said new data respectively.

16. The method according to claim 11, further comprising the step of selecting among a plurality of inputs prior to storing each said memory request.

17. The method according to claim 11, further comprising the step of maintaining at least one of said memory requests stationary in response to rearranging.

18. The method according to claim 17, further comprising the step of shifting said write requests to delay presentation in response to rearranging.

19. The method according to claim 18, further comprising the steps of:

presenting a selected read request to a bus in response to rearranging; and receiving said selected read request from said bus in response to rearranging.

* * * * *